(12) United States Patent
Torrence

(10) Patent No.: US 9,394,584 B2
(45) Date of Patent: Jul. 19, 2016

(54) METHOD OF RECOVERING SILVER AND PAPER FROM SILVER-COATED PAPER FILM

(71) Applicant: Tetra Recycling, Inc., Knoxville, TN (US)

(72) Inventor: Michael J. Torrence, Knoxville, TN (US)

(73) Assignee: Tetra Recycling, Inc., Knoxville, TN (US)

( * ) Notice: Subject to any disclaimer, the term of this patent is extended or adjusted under 35 U.S.C. 154(b) by 57 days.

(21) Appl. No.: 14/514,519

(22) Filed: Oct. 15, 2014

(65) Prior Publication Data
US 2015/0152520 A1    Jun. 4, 2015

Related U.S. Application Data

(60) Provisional application No. 61/911,287, filed on Dec. 3, 2013.

(51) Int. Cl.
| | | |
|---|---|---|
| *C22B 11/00* | (2006.01) | |
| *C22B 1/00* | (2006.01) | |
| *C22B 7/00* | (2006.01) | |
| *C22B 3/00* | (2006.01) | |
| *G03C 11/24* | (2006.01) | |

(52) U.S. Cl.
CPC ............... *C22B 11/046* (2013.01); *C22B 1/005* (2013.01); *C22B 7/008* (2013.01); *G03C 11/24* (2013.01); *Y02P 10/214* (2015.11); *Y02P 10/234* (2015.11)

(58) Field of Classification Search
CPC ...... C22B 11/046; C22B 7/008; C22B 1/005; C22B 3/44; C02F 1/70; G03C 11/24
See application file for complete search history.

(56) References Cited

U.S. PATENT DOCUMENTS

| | | | | |
|---|---|---|---|---|
| 3,647,422 | A | * | 3/1972 | Wainer .................... C22B 7/006 205/435 |
| 3,928,253 | A | | 12/1975 | Thornton et al. |
| 3,985,634 | A | | 10/1976 | Larson et al. |
| 4,078,916 | A | | 3/1978 | Gerber et al. |
| 4,279,644 | A | * | 7/1981 | Friar ....................... C22B 7/007 134/64 P |

(Continued)

FOREIGN PATENT DOCUMENTS

| | | |
|---|---|---|
| CA | 1129376 | 8/1982 |
| CA | 1222716 | 6/1987 |

(Continued)

*Primary Examiner* — George Wyszomierski
*Assistant Examiner* — Tima M McGuthry Banks
(74) *Attorney, Agent, or Firm* — Pitts & Lake, P.C.

(57) ABSTRACT

A process for recovery of silver from silver-containing photographic emulsion-coated films, particularly films with paper or polymeric substrates. The process includes immersing photographic silver emulsion coated substrates, particularly paper, in a water-based solution of sodium hydroxide and sodium borohydride, with sufficient presence of an alkali metal hydroxide to maintain the solution at a pH of 11.0 to 12.0. Silver-containing emulsion layers are stripped from the substrate, while gelatin and other adhesive layers are dissolved. Silver present in a silver halide form is reduced to form metallic silver. The silver-laden emulsion is then treated using a polyamine coagulant and flocculant to induce precipitation of solids, particularly metallic silver, out of the solution. The exposure time of the paper to the wash bath is carefully controlled to permit recovery of the paper substrate.

8 Claims, 4 Drawing Sheets

(56) References Cited

U.S. PATENT DOCUMENTS

| | | |
|---|---|---|
| 4,412,889 A | 11/1983 | Oeck |
| 4,612,057 A | 9/1986 | Buser et al. |
| 4,759,914 A | 7/1988 | Messerschmidt |
| 4,765,835 A | 8/1988 | Schoenhard |
| 4,799,954 A | 1/1989 | Hochberg |
| 5,286,463 A | 2/1994 | Schwartz, Jr. |
| 5,372,631 A * | 12/1994 | Barratt ............... C22B 3/44 75/713 |
| 5,685,962 A | 11/1997 | Ueffinger |
| 5,698,044 A | 12/1997 | Graham et al. |

FOREIGN PATENT DOCUMENTS

| | | | |
|---|---|---|---|
| EP | 0598145 | | 5/1994 |
| EP | 0989454 | | 3/2000 |
| JP | 61034125 A | * | 2/1986 |
| JP | 02159326 A | * | 6/1990 |

\* cited by examiner

METHOD OF RECOVERING SILVER AND PAPER FROM SILVER-COATED PAPER FILM

CROSS-REFERENCE TO RELATED APPLICATIONS

This application claims the benefit of U.S. Provisional Patent Application Ser. No. 61/911,287, filed Dec. 3, 2013, the contents of which is incorporated herein by reference.

STATEMENT REGARDING FEDERALLY SPONSORED RESEARCH OR DEVELOPMENT

Not Applicable

BACKGROUND OF THE INVENTION

1. Field of Invention

This invention pertains generally to processes for recovering silver from waste materials and, more particularly, to processes for recovering silver from paper.

2. Description of the Related Art

U.S. Pat. No. 3,928,253, issued to Thornton et al., discloses a procedure for separating and recovering clean polyester separately from the materials with which it is coated and for recovering desired values present in the coating materials, whereby the recovered polyester and other valuable recovered materials may be recycled thereby avoiding, or minimizing pollution from such materials. When the starting material is a polyester photographic film, the treatment includes detaching the contaminants from the polyester film base by contacting the polyester photographic film scrap with an aqueous solution of monoethanolamine containing a 2% to 15% by weight of water and having a temperature between 100° C. and 170° C., for a time sufficient to remove both the coating and the subcoating from said base. This treatment generally includes the mechanical separation of coatings in solution using screens and sleeves.

U.S. Pat. No. 4,078,916, issued to Gerber et al., discloses a process in which scrap photographic film comprising at least a four component system involving a polyalkyleneterephthalate film base, an adhesive or subbing layer utilizing a terpolymer consisting chiefly of polyvinylidenechloride and a gelatin layer containing metallic silver or a compound thereof and a variety of contaminants such as causal dirt, dyes and the like is broken down for recovery of the valuable constituents therein including the silver, the polyvinylidenechloride terpolymer, and the polyesters by treating the chopped photographic film at an elevated temperature with a solvent for both the polyester and polyvinylidenechloride values in which solvent both the gelatin and silver values are insoluble, under conditions chosen to insure the quantitative recovery of the silver values. This is solvent-based approach to recover major components as raw materials, with silver as a metallic element. Such solvent-based silver-recovery approaches have a limited effectiveness.

U.S. Pat. No. 4,765,835, issued to Schoenhard, discloses a process in which silver is removed from polymeric film chips such as photographic and X-ray film in a caustic treatment bath which dissolves or separates the saran and gelatin layer from the polymer, particularly polyester, layer. The silver is captured for recovery in a diatomaceous filter medium through which the treatment bath liquid is passed. Preferably liquid passed to the filter is silver-rich liquid skimmed from the top of the treatment bath. Chips and other debris are seived or screened from the liquid before filtering. This approach uses base metal salts such as sodium chloride and potassium chloride, as well as oxidizing agents like sodium hypochlorite, ozone, and hydrogen peroxide. The disclosed process also uses monoethamolamine and morpholine, at least in some embodiments. Additionally, this approach relies upon sieves and screens to separate substrates and coatings, and the process does not reduce the recovered silver.

U.S. Pat. No. 4,799,954, issued to Hochberg, discloses a process for the recovery of silver from exposed or unexposed photographic film using a caustic alkali solution at elevated temperatures with high shear. The photographic film is generally coated with an adhesion promoting layer such as a vinylidine chloride polymer or copolymer, which in turn, is coated with a light-sensitive emulsion layer containing a silver halide. In accordance with the present invention, the photographic film, whether in an exposed and developed or unexposed state, is contacted with a caustic alkali solution. The caustic used can, for example, be sodium hydroxide or potassium hydroxide of which sodium hydroxide is preferred. The concentration of the solution should be at least about 7 wt. percent of the caustic, and maintained at a treatment temperature of about from 140° F. to 200° F. The photographic film, in the hot caustic solution, is subjected to high shear. High shear is used in its conventional sense, that is, mixing sufficient to create turbulent as opposed to laminar flow within the treatment vessel. To promote high shear, the photographic film is preferably in the form of small pieces, so that the turbulence of the film pieces aids in the development of shear within the treatment vessel. Particularly preferred are pieces of film ranging in size from about 2 to about 30 millimeters in the longest dimension. The high shear mixing in the caustic solution is carried out for a period sufficient to reduce the silver halides in the emulsion layer to metallic silver.

U.S. Pat. No. 5,064,466, issued to Hilton, discloses a non-toxic process for the recovery of silver from silver containing photographic emulsion coated paper or film substrates. The process includes the use of a stripping formulation comprised of an alkaline bleach solution which is capable of holding stripped animal protein, silver and silver halide in solution during separation of the substrate materials. The solution containing the silver, silver halide and animal protein is treated with a strong or highly ionized acid which results in controlled precipitation of hydrolyzed animal protein, silver and silver halide. Waste fluids are neutralized with an alkali metal hydroxide, the precipitate is dried to a sludge, carbon content of the sludge is control burned and the residue is smelted with appropriate fluxes in order to achieve silver ingot. This process provides no reduction of silver halides, and the process uses hypochlorite (which always presents a risk of chlorine gas if not used carefully). This process does not recover paper or substrates after stripping.

U.S. Pat. No. 5,286,463, issued to Schwartz, discloses a composition for use in reducing and recovering metals, such as silver, and for use in stripping adhesive polymer layers from various polymer bases, such as polyester, and processes for using same are provided. The composition and variations thereof can be useful in separating an adhesive polymeric layer from the film for recovery of either. The composition comprises a reducing sugar/alkaline solution that is particularly useful for recovering silver from polyester photographic film where a silver halide light-sensitive emulsion layer is adhered to the polyester film by a polymeric adhesive resin, such as resins containing copolymers of polyvinylidene chloride and polyvinyl chloride. This process uses reducing sugars, spraying the composition on paper and then preheating the paper to about 80° C. to effect silver reduction. Paper and coating are then burned to recover silver.

A need is felt for a process for recovering silver from paper that also allows recovery, followed by reuse and repurposing, of the paper substrate.

BRIEF SUMMARY OF THE INVENTION

Disclosed herein is a process for recovery of silver from silver-containing emulsion-coated films, particularly films with paper or polymeric substrates, such as X-ray films and various photographic films. The process includes immersing photographic silver emulsion coated substrates, particularly paper, in a water-based solution of sodium hydroxide and sodium borohydride, with sufficient presence of an alkali metal hydroxide to maintain the solution at a pH of 11.0 to 12.0. Silver-containing emulsion layers are stripped from the substrate, while gelatin and other adhesive layers are dissolved. Silver present in a silver halide form is reduced to form metallic silver. The silver-laden emulsion is then treated using a polyamine coagulant and flocculant to induce precipitation of solids, particularly metallic silver, out of the solution. The solid precipitates are separated from water by means of gravitational clarification. The settlings, as well as the clarified water, are then filtered using a filter press to produce highly enriched silver cake suitable for conventional smelting methods.

The recovery of the paper substrate is achieved by means of controlling the exposure time of the paper to the wash bath. Given the pH range of the wash solution used and the elevated temperature of the bath, maintaining the structural integrity of the paper requires exposing the paper to the bath for no more than 15 minutes, and generally for approximately 10 minutes. In some embodiments of the present general inventive concept, it was found that by precisely controlling the silver-emulsion-coated paper's exposure time to 10 minutes, the polylaminate membrane remains intact, helping to protect the cellulose paper substrate from the highly alkaline solution. In this process, there is very minimal wicking observed.

In some embodiments of the present general inventive concept, a process to recover silver from silver-emulsion-coated substrates includes immersing photographic silver-emulsion-coated substrates in a water-based wash solution of sodium hydroxide and sodium borohydride, with sufficient presence of an alkali metal hydroxide to maintain the solution at a pH of 11.0 to 12.0, reducing silver halide to form metallic silver, treating the emulsion using a polyamine coagulant and flocculent to induce precipitation of solids, particularly metallic silver, out of the solution, separating precipitates from water through gravitational clarification, and filtering the precipitates and water using a filter press to produce highly enriched silver cake.

In some embodiments, the water-based solution of sodium hydroxide and sodium borohydride is at a temperature between 170 and 180 degrees Fahrenheit.

In some embodiments, the photographic silver-emulsion-coated substrates are immersed in the water-based solution of sodium hydroxide and sodium borohydride for approximately 10 minutes.

In some embodiments, the photographic silver-emulsion-coated substrates are immersed in the water-based solution of sodium hydroxide and sodium borohydride for between 10 and 15 minutes.

In some embodiments of the present general inventive concept, a method for recovering silver and paper from silver-coated paper substrates includes shredding silver-coated paper materials into silver-coated paper fragments, transferring the silver-coated paper fragments into wash baskets, immersing the wash baskets and silver-coated paper fragments into an alkaline wash solution, whereby silver is separated from the paper fragments, forming a silver-bearing emulsion solution, removing the paper fragments from said wash solution and from said wash baskets, rinsing the paper fragments with water, recycling the rinsed paper fragments, and treating the silver-bearing emulsion solution with a polyamine coagulant and flocculent to produce silver precipitate.

In some embodiments, the method also includes filter-pressing the silver precipitate to produce silver cake, reducing the silver cake to ash by burning off carbonaceous content, and smelting the ash to recover silver.

In some embodiments, the alkaline wash solution contains sodium hydroxide and sodium borohydride.

In some embodiments, the silver-coated paper fragments are immersed in the alkaline wash solution for between 10 and 15 minutes.

In some embodiments, the alkaline wash solution is heated to between 170 and 180 degrees Fahrenheit during the wash.

In some embodiments, the silver-coated paper fragments are immersed in the alkaline wash solution for between 10 and 15 minutes.

In some embodiments, the alkaline wash solution is heated to between 170 and 180 degrees Fahrenheit during the wash.

In some embodiments, the alkaline wash solution contains sodium hydroxide and sodium borohydride.

BRIEF DESCRIPTION OF THE DRAWINGS

The above-mentioned and additional features of the invention will become more clearly understood from the following detailed description of the invention read together with the drawings in which.

DETAILED DESCRIPTION

Figure 1:
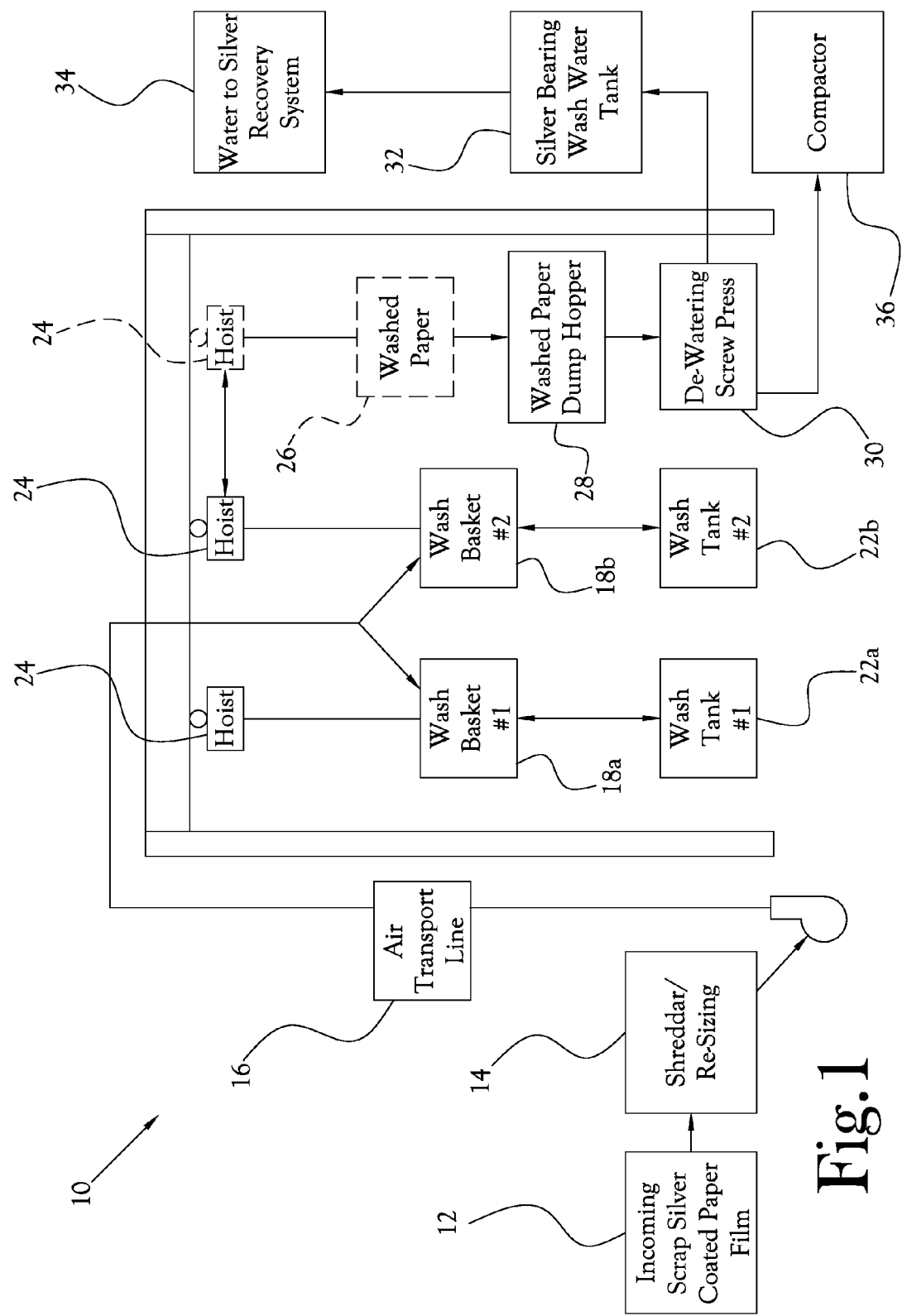
FIG. 1 is a schematic view showing one method of recovering silver from paper according to an embodiment of the present invention.

In accordance with several features of the present invention, a method of recovering silver and paper from silver-coated paper film is disclosed herein and in the accompanying Figures. In some of its many embodiments, the present general inventive concept includes a process for washing silver-emulsion-coated films, including paper films, in an alkaline wash solution with elevated pH and elevated temperate, permitting high recovery of silver in the form of precipitate silver cake and the recovery of paper to be recycled. Disclosed processes, systems and methods allow for recovery of silver from such silver-containing emulsion-coated sources as X-ray films and various photographic films.

In some embodiments, a method for recovering silver and paper from silver-coated paper substrates includes shredding silver-coated paper materials into silver-coated paper fragments, transferring the silver-coated paper fragments into wash baskets, immersing the wash baskets and silver-coated paper fragments into an alkaline wash solution, whereby silver is separated from the paper fragments, forming a silver-bearing emulsion solution, removing the paper fragments from the wash solution and the wash baskets, rinsing the paper fragments with water, recycling the rinsed paper fragments, and treating the silver-bearing emulsion solution with a polyamine coagulant and flocculent to produce silver precipitate.

The methods in accordance with several features of the present invention includes immersing photographic silver-emulsion-coated substrates, particularly paper, in a water-based solution of sodium hydroxide and sodium borohydride, with sufficient presence of an alkali metal hydroxide to maintain the solution at a pH of 11.0 to 12.0. Silver-containing emulsion layers are stripped from the substrate, while gelatin and other adhesive layers are dissolved. Silver present in a silver halide form is reduced to form metallic silver. The silver-laden emulsion is then treated using a polyamine coagulant and flocculent to induce precipitation of solids, particularly metallic silver, out of the solution. The solid precipitates are separated from water by means of gravitational clarification. The settlings, as well as the clarified water, are then filtered using a filter press to produce highly enriched silver cake suitable for conventional smelting methods.

The recovery of the paper substrate may be achieved by means of controlling the exposure time of the paper to the wash bath. Given the pH range of the wash solution used (generally a pH of 11.0-12.0) and the elevated temperature of the bath (generally 170° F.-180° F.), maintaining the structural integrity of the paper requires exposing the paper to the bath for no more than 15 minutes, and generally for approximately 10 minutes. Exposure of the paper to the wash solution for any longer than 15 minutes may cause the polylaminate membrane on both sides of the paper to begin to lift or detach from the paper; as well as diminishing the integrity and value of the recovered paper, this detachment of the polylaminate membrane from the paper can allow the silver-rich solutes in the solution to wick into the cellulose core of the paper substrate—thereby diminishing the potential yield of silver recovered. Additionally, wicking is not desirable since the high alkalinity of the wash bath solution can initiate the pulping process of the cellulose fibers, thus rendering the paper unsuitable for recycling.

In some embodiments of the present general inventive concept, it was found that by precisely controlling the silver-emulsion-coated paper's exposure time to 10 minutes, the polylaminate membrane remains intact, helping to protect the cellulose paper substrate from the highly alkaline solution. This process may result in very minimal wicking. In this embodiment, only around the edges where the actual substrate core is exposed due to the initial shredding or resizing of the original coated paper.

One embodiment of the method constructed in accordance with several features of the present invention is illustrated in FIG. 1. FIG. 1 provides a simplified block diagram that shows one example embodiment of the methods 10 according to one example embodiment of the present general inventive concept. As shown in FIG. 1, incoming scrap silver-coated paper film 12 is fed into a shredder for resizing 14. Next, the resized scrap silver-coated paper film fragments are transferred (often by air transport line 16) to wash baskets 18 through the transferring process of shredded paper to wash baskets 20. The wash baskets 18a, 18b lower the scrap silver-coated paper film fragments into wash tanks 22a, 22b containing the alkaline wash solution. There, the silver-containing emulsion layers are stripped from the paper substrate of the paper film fragments. Gelatin and other adhesive layers on the paper film fragments are dissolved, although the polylaminate membrane covering the cellulose core of the paper remains intact. The fragments are washed in the wash solution for 10 minutes. Then, the wash baskets 18a,18b are lifted out of the wash tanks via a hoist mean 24, and the contents of the wash baskets 18a, 18b—mainly paper fragments 26—is fed into a washed paper dump hopper 28, which in turn feeds the washed paper into a dewatering screw press 30. The water solution, containing some residual unprecipitated silver 32, is diverted to another silver-recovery system 34. Meanwhile, the de-coated paper is conveyed to a compactor 36 for recycle. The exemplary apparatus illustrated in FIG. 1 contains two wash baskets, 18a, 18b and two corresponding wash tanks 22a, 22b to demonstrate that multiple washing processes can be conducted and implemented within an apparatus. However, the number of wash baskets and wash tanks may vary without departing from the spirit and scope of the present invention.

Figure 3:
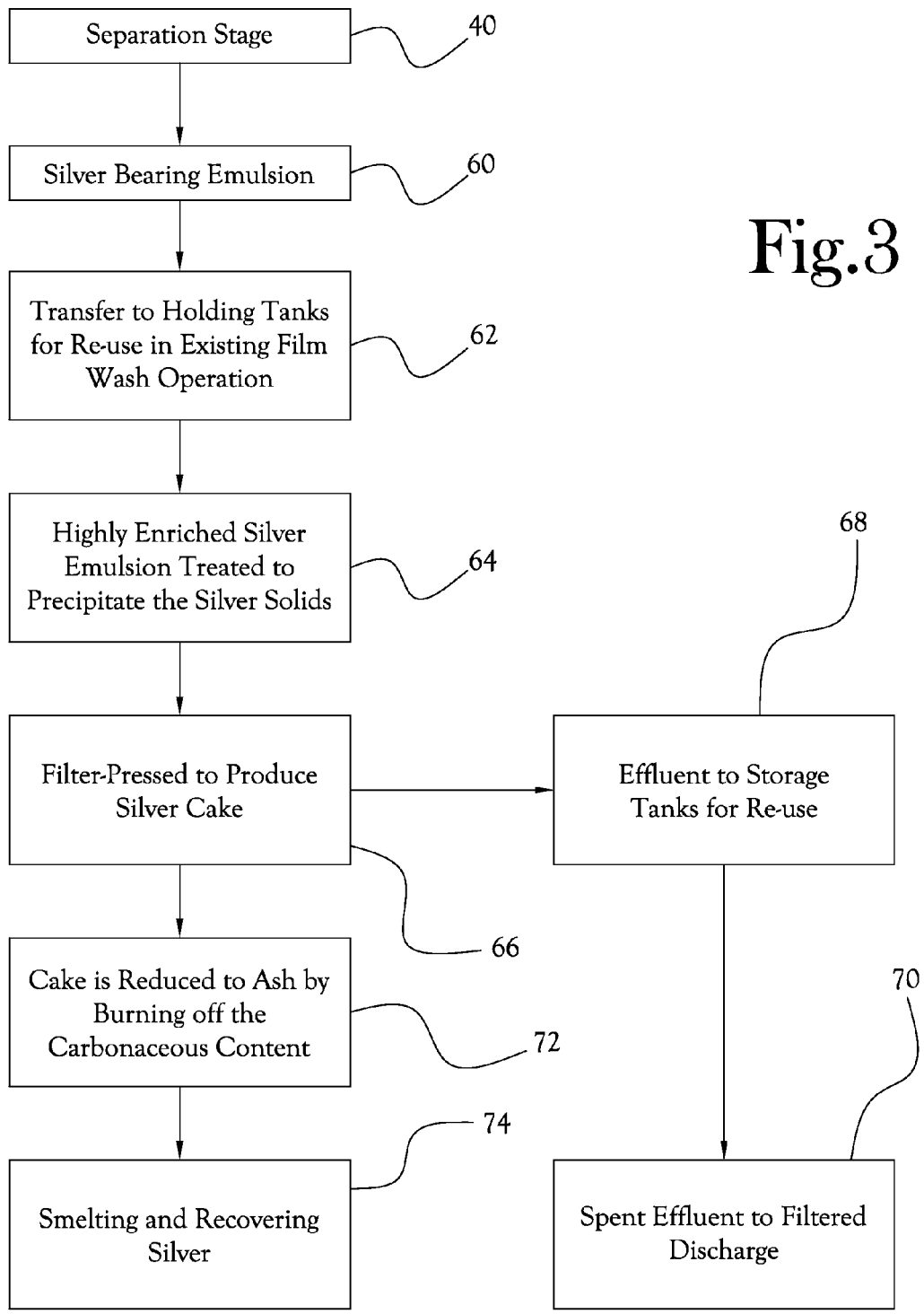
FIG. 3 is a flowchart showing the paper recovering stage of the method of recovering silver and paper from silver-coated paper film according to an embodiment of the present invention.
Figure 4:
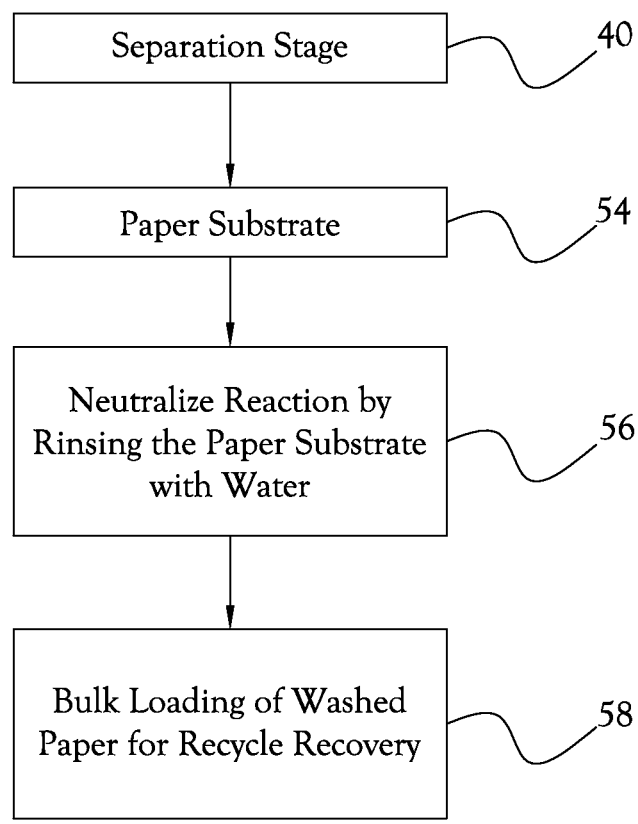
FIG. 4 is a flowchart showing the silver recovering stage of the method of recovering silver and paper from silver-coated paper film according to an embodiment of the present invention.

In accordance with several features of the present invention, the method may be divided to three stages: the separation stage, the paper recovering stage, and the silver recovering stage. The steps of the stages constructed in accordance with several features of the present invention are illustrated in FIGS. 2-4.

Figure 2:
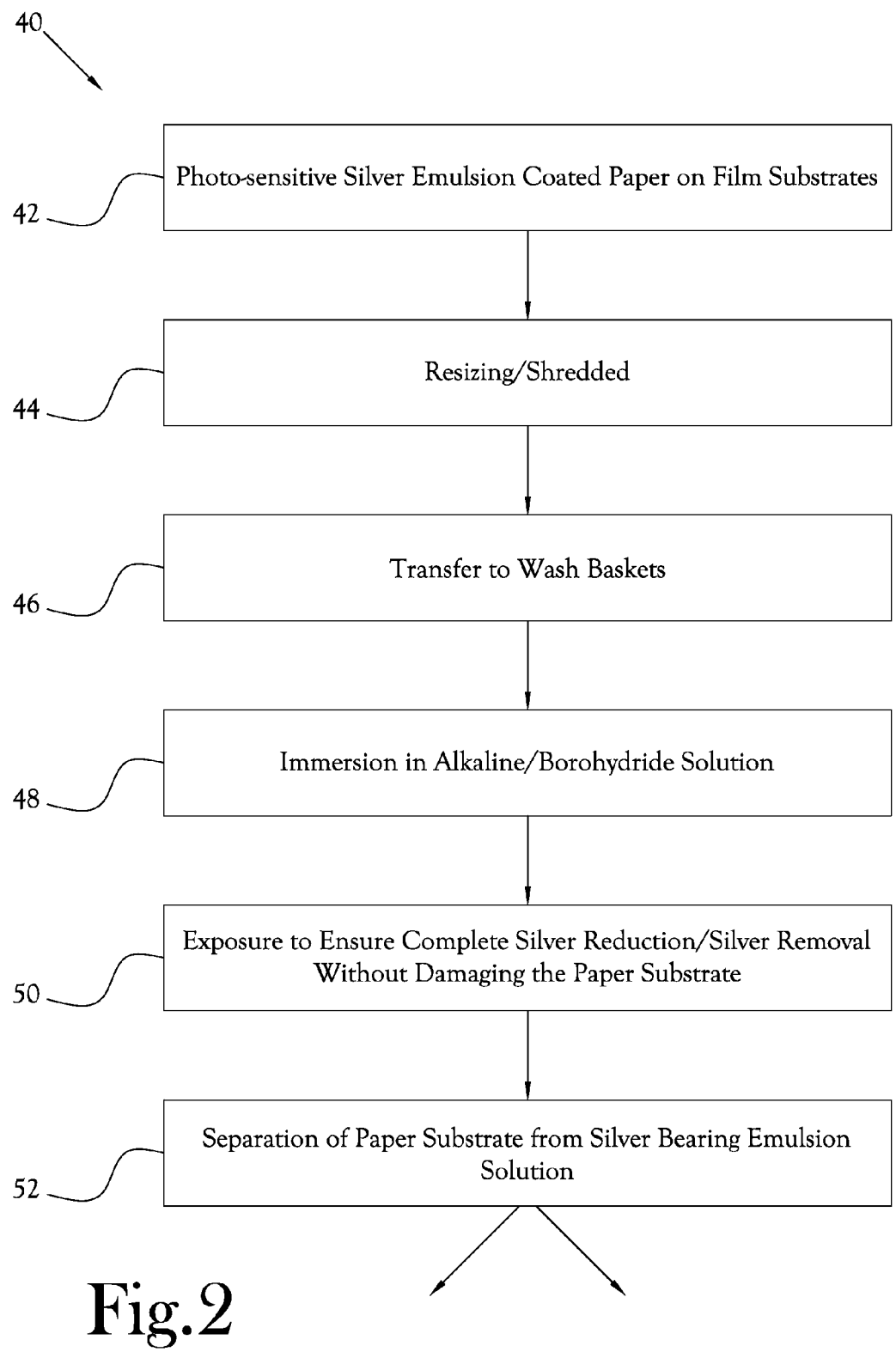
FIG. 2 is a flowchart showing the silver removing stage of the method of recovering silver and paper from silver-coated paper film according to an embodiment of the present invention.

FIG. 2 shows a flow chart of the separation stage 40 of according to one exemplary embodiment of the present general inventive process. Referring to FIG. 2, in one example embodiment of the present general inventive concept, silver-emulsion-coated paper or film substrates, herein referred to as "coated paper" are first provided 42. The coated paper are then resized in a shredder for better uniformity 44 and transferred to wash baskets 46. The contents of the wash baskets are immersed in an alkaline borohydride solution 48 for a predetermined length of time to separate silver from the paper or film substrate without damaging the paper or film substrate 50. After a predetermined time as reached, the alkaline borohydride wash solution has now become a silver-bearing emulsion solution, and this silver-bearing emulsion solution is separated from the paper or film substrate 52.

The paper substrate from silver bearing emulsion solution would then proceed to recovering processes after the separation 52. FIG. 3 shows a flowchart of paper recovering stage, and FIG. 4 shows a flowchart of silver recovering stage. As shown in FIG. 3, the paper or film substrate 54 resulted from the separation stage is rinsed with water to neutralize any continuing reactions from the alkaline borohydride wash solution 56. The rinsed paper or film then proceeds to recycle 58. Meanwhile, as shown in FIG. 4, the silver-bearing emulsion solution 60 resulted from the separation stage 52 is transferred to holding tanks for reuse in existing film wash operations 62, leading after several iterations to a highly enriched silver emulsion solution. At a predetermined point, the highly enriched silver emulsion solution is treated with a polyamine coagulant and flocculent, or with a similar precipitator, to precipitate solid metallic silver out of the solution 64. The solid metallic silver precipitate is filter-pressed to produce silver cake 66; the effluent from the filter press procedure is generally sent to storage tanks for reuse in wash operations 68, until eventually spent effluent is diverted through a filtered discharge 70. The silver cake is reduced to ash by burning off carbonaceous content 72, and the product is then smelted to recover silver 74.

Several example systems, methods, and procedures according to the foregoing general inventive concept allow for recovery of approximately 98% of silver from scrap silver-coated waste materials by releasing silver particles from gel and immediately reducing them in the wash solution. Example embodiments of the present general inventive concept allow for silver recovery with no surfactant, no emulsifier, no acid, and no shear or agitation. Further, example embodiments of the present general inventive concept allow for recovery and recycling of the paper substrate of many silver-coated paper films.

Some embodiment of the above method include the further steps of filter-pressing the silver precipitate to produce silver cake, reducing the silver cake to ash by burning off carbonaceous content, and smelting the ash to recover silver.

In some embodiments, the alkaline wash solution contains sodium hydroxide and sodium borohydride. In some embodiments, the alkaline wash solution is heated to between 170 and 180 degrees Fahrenheit during the wash. In some embodiments, the silver-coated paper fragments are immersed in the alkaline wash solution for between 10 and 15 minutes.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A method for recovering silver and paper from silver-coated paper substrates, comprising:
    shredding silver-coated paper materials into silver-coated paper fragments;
    transferring the silver-coated paper fragments into wash baskets;
    immersing the wash baskets and silver-coated paper fragments into an alkaline wash solution, whereby silver is separated from the paper fragments, forming a silver-bearing emulsion solution;
    removing the paper fragments from said wash solution and from said wash baskets;
    rinsing the paper fragments with water;
    recycling the rinsed paper fragments; and
    treating the silver-bearing emulsion solution with a polyamine coagulant and flocculent to produce silver precipitate.

2. The method of claim 1 comprising the further steps of:
    filter-pressing the silver precipitate to produce silver cake;
    reducing the silver cake to ash by burning off carbonaceous content; and
    smelting the ash to recover silver.

3. The method of claim 2 wherein the alkaline wash solution contains sodim hydroxide and sodium borohydride.

4. The method of claim 3 wherein the silver-coated paper fragments are immersed in the alkaline wash solution for between 10 and 15 minutes.

5. The method of claim 2 wherein the alkaline wash solution is heated to between 170 and 180 degrees Farenheit during the wash.

6. The method of claim 2 wherein the silver-coated paper fragments are immersed in the alkaline wash solution for between 10 and 15 minutes.

7. The method of claim 1 wherein the alkaline wash solution is heated to between 170 and 180 degrees Farenheit during the wash.

8. The method of claim 1 wherein the alkaline wash solution contains sodim hydroxide and sodium borohydride.

* * * * *